(12) United States Patent
Shih et al.

(10) Patent No.: US 10,298,435 B2
(45) Date of Patent: May 21, 2019

(54) SERVER LINK STATE DETECTION AND NOTIFICATION

(71) Applicant: Quanta Computer Inc., Taoyuan (TW)

(72) Inventors: Ching-Chih Shih, Taoyuan (TW); Yu-Chu Huang, Taoyuan (TW); Wen-Yuan Hung, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 296 days.

(21) Appl. No.: 14/733,274

(22) Filed: Jun. 8, 2015

(65) Prior Publication Data

US 2016/0359982 A1   Dec. 8, 2016

(51) Int. Cl.
| | | |
|---|---|---|
| *G06F 15/16* | (2006.01) | |
| *H04L 12/24* | (2006.01) | |
| *H04L 29/12* | (2006.01) | |
| *H04L 12/26* | (2006.01) | |
| *H04L 12/939* | (2013.01) | |

(52) U.S. Cl.
CPC .......... *H04L 41/04* (2013.01); *H04L 43/0811* (2013.01); *H04L 49/55* (2013.01); *H04L 61/2015* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 6,317,798 B1* | 11/2001 | Graf | ..................... | G06F 9/4443 709/219 |
| 8,745,437 B2* | 6/2014 | Armstrong | .......... | H04L 41/0668 714/4.12 |
| 2008/0205377 A1* | 8/2008 | Chao | .................. | H04L 41/0213 370/351 |
| 2009/0016366 A1* | 1/2009 | Endo | ...................... | H04L 45/00 370/401 |
| 2009/0300209 A1* | 12/2009 | Elzur | ...................... | H04L 47/10 709/234 |
| 2012/0291029 A1* | 11/2012 | Kidambi | ................. | H04L 49/70 718/1 |
| 2013/0269030 A1* | 10/2013 | Milford | ................... | G06F 21/50 726/22 |
| 2015/0237003 A1* | 8/2015 | Ghai | ................... | H04L 61/2015 709/220 |
| 2016/0094667 A1* | 3/2016 | Jani | ........................ | H04L 69/32 709/202 |

\* cited by examiner

*Primary Examiner* — Hamza N Algibhah
*Assistant Examiner* — Gregory P Tolchinsky
(74) *Attorney, Agent, or Firm* — Nixon Peabody LLP; Zhou Lu

(57) ABSTRACT

Embodiments generally relate to link state change detection and notification within a server with embedded or directly integrated network switch. In a server configuration in which there is no longer a distinct separation between a network switch and a network interface card (NIC), the server can no longer immediately detect a change in the link state of any of the switch's ports. This can lead to connection failure. A Link State Policy Table is thus implemented within the embedded or integrated switch, capable of changing the NIC link state according to one or more pre-defined or user-defined policy settings. The server is then notified of the change in the NIC link state, and can release an old IP address or request a new IP address accordingly.

20 Claims, 9 Drawing Sheets

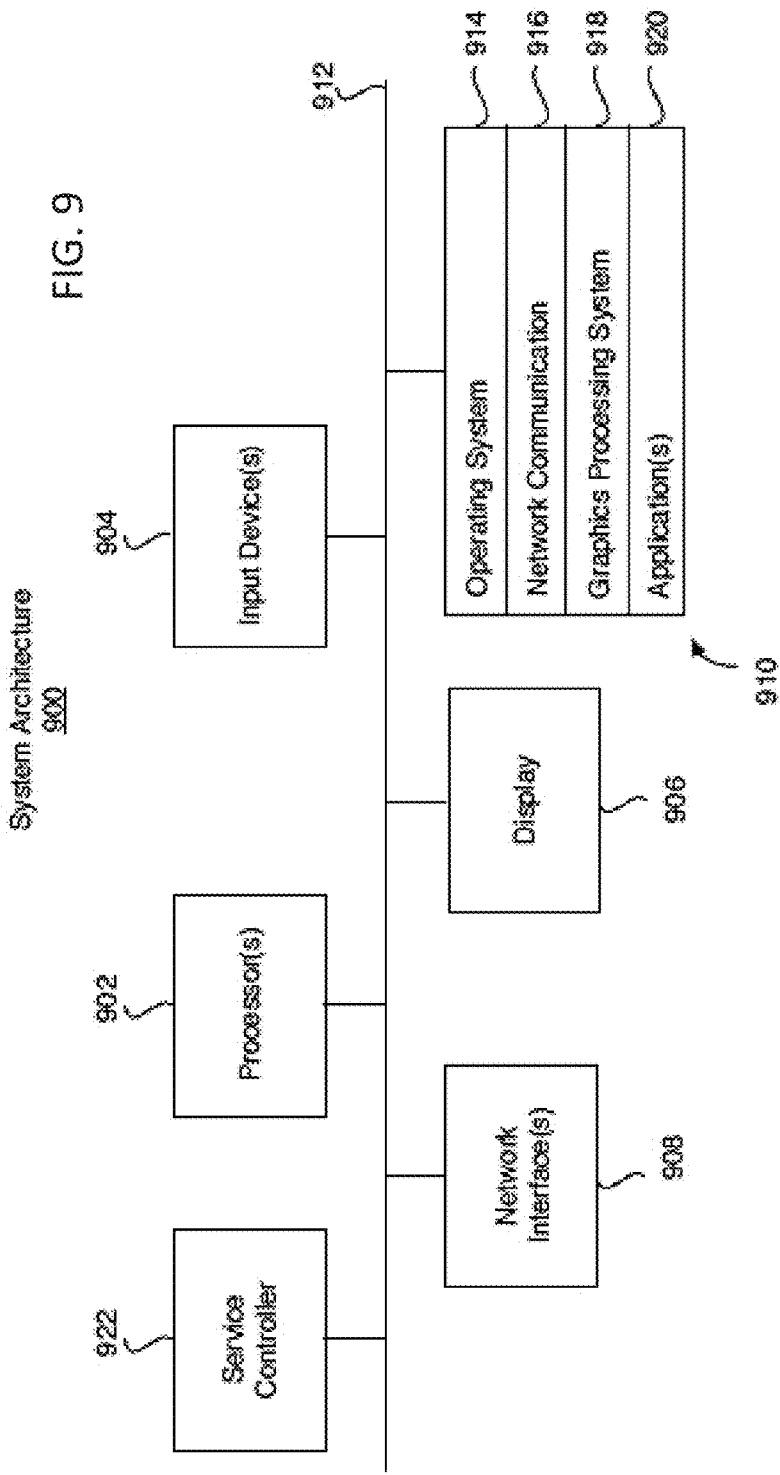

SERVER LINK STATE DETECTION AND NOTIFICATION

FIELD OF THE INVENTION

The disclosure relates generally to server technology, and more particularly to link state detection and notification on servers.

BACKGROUND

Server systems have long utilized network switches, commonly referred to as "switches," to serve as a central connection for network equipment and devices. Switches are able to identify a system or device connected to a particular port of the switch, and are able to filter and send data to the system or device without increasing network response times. Network interface cards (NICs) generally are hardware cards within networked devices that handle many of the technical aspects of sending and receiving packets of data, such as to and from servers. In a traditional server setup, an Ethernet cable is directly plugged into an NIC of the server device on one end, and into a port of a switch on the other end that is external to the server and NIC.

Dynamic Host Configuration Protocol (DHCP) is a network protocol that automatically assigns an Internet Protocol address (IP address) to a networked device, from a defined range of addresses configured for a given network. A server or other networked device sends a DHCP request to a DHCP server to request an IP address, and the DHCP server responds, confirming that the device has been given a lease on the IP address for a specified period of time.

In a server design in which a switch is external to the server and NIC, the server can detect a link state change of the switch, such as when a user plugs or unplugs an Ethernet cable to or from a port of the switch. The server can then instruct the DHCP client of the server to negotiate a DHCP protocol to obtain a new IP address if one is needed.

SUMMARY

Aspects of the present technology provide for link state detection and notification in servers. This applies in particular to systems in which there is no physical separation between a network interface card (NIC) and a network switch, such that the switch and NIC are integrated together in some way, or the switch is embedded or integrated into the server, as in many modern designs. In such systems, the server (e.g., DHCP client software installed on the server) is unable to be notified of the link state changes (e.g., "up," meaning connected, or "down," meaning unconnected) of any port within the network switch. This often results in connection failure. In response to this, example embodiments provide for detecting a link state change in an NIC within the server. The link state change is based on the link state change in one or more ports of the network switch. A DHCP client of the server obtains an IP address for a network (e.g., for a new domain) when the link state change in the network interface card registers as up. The server's DHCP client then associates the IP address with the server.

In some embodiments, a Link State Policy Table may be accessible by the network switch, and may be configured to change the NIC link state according to one or more policy settings. In some embodiments, the Link State Policy Table is implemented through software instructions encoded in the switch firmware or encoded in non-volatile storage accessible by the CPU, while in other embodiments the Link State Policy Table is implemented through a hardware register within the switch. In some embodiments, the policy settings may be user-defined and configurable. In an embodiment, the Link State Policy Table is configured such that the link state changes within the switch are reflected in a NIC link state change. The server is automatically notified of the NIC link state change, and may respond by providing instructions regarding which steps to take in the DHCP protocol process. In some embodiments, the CPU of the server sends instructions to a DHCP client.

For example, if the NIC link state (e.g., for a port of the switch) registers as "down", the server may respond by releasing the old IP address that is no longer being used, while if the NIC link state registers as "up", the server may send a DHCP request to attempt to obtain a new IP address from the new server.

In some embodiments, the server may be informed of a link state change through a hardware-implemented link state detection signal. In some embodiments, the link state detection signal detects a status of a link state LED of the server, and transmits the link state to the server. In some embodiments, the hardware signal connects to the server through a CPU interrupt.

In some embodiments, the server may be notified of a link state change through a polling process, in which the server periodically checks the link state of the switch by polling the switch API or register.

BRIEF DESCRIPTION OF THE DRAWINGS

Various embodiments or examples of the invention are disclosed in the following detailed description and the accompanying drawings:

FIG. 9 is a block diagram of an example system architecture implementing the features and processes of FIGS. 1-8.

DETAILED DESCRIPTION

Figure 1:
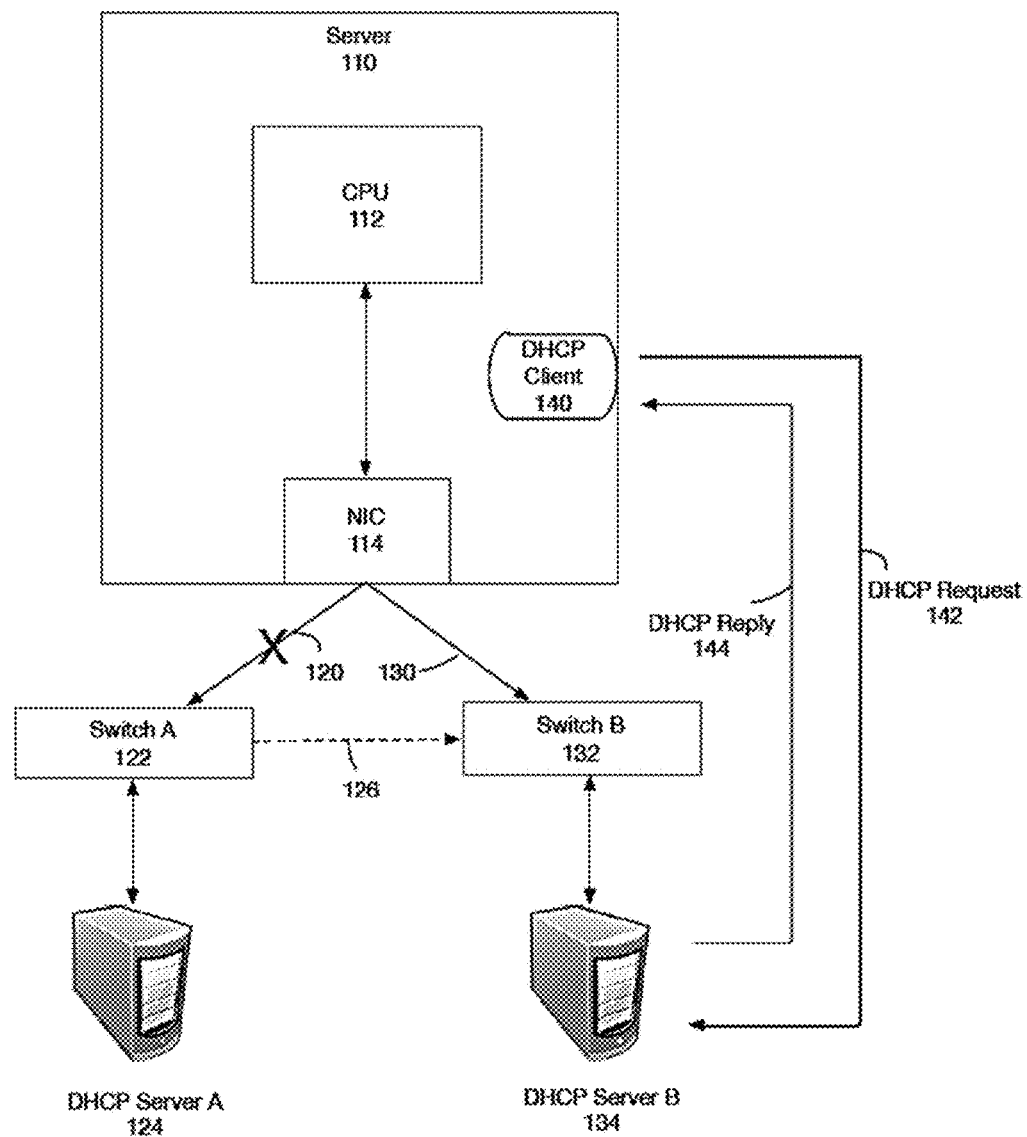
FIG. 1 illustrates a server configuration in which a state change is detected.

Various embodiments are discussed in detail below. While specific implementations are discussed, it should be understood that this is done for illustration purposes only. A person skilled in the relevant art will recognize that other components and configurations may be used without departing from the spirit and scope.

In server computing systems, maintaining a connection between the various components of the system is important. When a physical cable is used between a server and an external switch, essential information is obtained which allows the server to connect and communicate with a network domain in a steady, consistent fashion. In particular, an Internet Protocol (IP) address must be obtained and assigned to the server in order for the server to be properly identified and to allow data to be transmitted to and from the server and network domain.

Dynamic Host Configuration Protocol (DHCP) is a network protocol which allows IP addresses to be dynamically assigned to a server by a DHCP server. When the server connects to a network, its DHCP client software sends a broadcast query requesting needed information. Generally, any DHCP server on the network may service the request. The DHCP server manages a pool of IP addresses and other information. Upon receiving the request, the DHCP server may respond with a specific IP address, and a time period for which the allocation, or lease, is valid. The server then binds the IP address, for example to a network interface, and communication of data can be performed.

Some events may occur in which an IP address must be reestablished or changed. One example is when a link state change occurs. Traditionally, one or more network interface cards, or NICs, reside within the server. A NIC typically is communicatively coupled to the motherboard of the server, and may contain one or more Ethernet or other communication ports. NICs generally handle many of the technical aspects of sending and receiving packets of data to and from servers, as well as establishing connections with switches and networks.

Network switches, commonly referred to as switches, serve as a central connection for network equipment and devices. Switches contain a multitude of ports, such as Ethernet ports, which allow networked devices to connect and communicate. Switches are able to identify which system or device is sitting on which port of the switch, and are able to filter and send data to the system or device. In a common traditional server configuration, a NIC of a server may be physically connected to a port of an external switch, such as by an Ethernet cable. Once this physical connection exists, then the previously-discussed DHCP protocol can begin, allowing a DHCP client on the server to send a DHCP request to a DHCP server of the network, and allowing the DHCP server to respond with a specific IP address to bind to the server.

When the NIC and the switch are connected, they are said to be "linked", and the NIC link state registers as "up." This indicates that the link is active between the NIC and switch. In addition, each port of the switch contains a link state as well. The specific port of the switch which the NIC connects to will have a port link state which registers as "up," indicating that the Ethernet port is in use and that the link is active between the NIC and that port of the switch. When something happens to break the connection between the NIC and switch, the NIC link state and switch port link state both register as "down," meaning the link is inactive. In an example of the cable being physically unplugged from the external switch, both the NIC link state and switch port link state will register as down. The DHCP client software installed on the server can detect this unplugging event automatically, and will release the IP address that was leased. When the cable is moved to a different switch, then the NIC link state will be up, the port link state of the first switch will be down, and the port link state of the second switch will be up. The DHCP client will again detect this change in link state, and will send a DHCP request to request an IP address again. If the old IP address is still available in the old IP network domain, then the old IP address will be obtained and bound to the server. However, if the connection has moved to a new IP network domain, then a new IP address will be sent and bound to the server.

Thus, in a traditional server setup where a server directly connects to an external switch, in the event of a user plugging or unplugging the Ethernet cable, the DHCP client software installed on the server can detect this event and deal with the DHCP negotiation accordingly, whether that means obtaining the old IP address, or obtaining a new IP address if the connection has moved to a new IP network domain. Such behavior can prevent a situation where the operator changes the network domain, but the operating system is still using the old IP address, thus causing a connection failure. Since the switch and the networked device are separate, state changes can be easily detected.

While this detection and resolution has worked in the older, traditional server design with an external switch, increasingly, new server designs are integrating a switch directly into the server. In some embodiments of such a configuration, switches with multiple ports are installed in the device itself. In some embodiments, servers may include embedded switches in which an NIC is coupled with and integrated directly into the switch. These new server designs present problems, such as state changes no longer being detected automatically. The NIC and the embedded switch of the device are in constant communication, and there is no physical cable between them that can allow for state change detection when the cable is moved, for example to another external switch. The NIC link state always registers as "up", or in active communication with the integrated switch. This results in situations where a cable is switched from one network domain to another, but the DHCP process fails to be triggered and a new address is not obtained, leading to connection failure.

Embodiments of the present technology thus address the need in the art for link state detection and notification for servers, for example with embedded switches. Once the switch detects an external port link state change, it can follow a defined link state policy, for example stored in a Link State Policy Table within the switch, to change the NIC link state. With this server configuration, the server can also detect when a link state is changed, and can accordingly allow the DHCP client to send a DHCP request.

FIG. 1 illustrates a server configuration in which a state change is detected. FIG. 1 shows how server configurations have dealt with link state changes. In the illustrated example, an Ethernet cable attached to a NIC of a server is unplugged from a port of an external switch and moved to a port of another switch. The link state change of the NIC is detected, and the DHCP client sends a DHCP request to the new DHCP server.

Server 110 is a computing device which connects to a network. Server 110 connects and communicates to several networks and transfers data to and from those networks. In some embodiments, the networked device may be a computer workstation, a notebook personal computer, or the like.

Server 110 contains a central processing unit, or CPU 112. CPU 112 processes instructions and causes functions of the server 110 to be performed. CPU 112 resides on the motherboard of the server 110. CPU 112 is connected to a network interface card, or NIC 114. NIC 114 also resides on the motherboard of the server 110. NIC 114 is a server hardware component which allows the server 110 to connect to a network. NIC 114 contains an Ethernet port, to which an Ethernet cable may be plugged in. NIC 114 possesses an NIC link state which may register as "up" or "down". An "up" state indicates that a link is established between the NIC and a switch, whereas a "down" state indicates that no link is established between the NIC and a switch.

DHCP client 140 resides on Server 110. DHCP client 140 is a software component installed on Server 110 which negotiates the DHCP protocol process between server 110 and outside DHCP servers. DHCP client 140 is capable of sending out DHCP requests to DHCP servers to query for an IP address, and receiving DHCP replies from DHCP servers containing an IP address. DHCP client 140 is also capable of receiving signals from NIC 114 regarding NIC link state changes, and acting upon them. When NIC 114 link state registers as "down", DHCP client 140 releases an IP address that was previously bound to server 110. When NIC 114 link state changes from "down" to "up", DHCP client 140 requests a new IP address.

In the example of FIG. 1, Switch A 122 is the first external network switch that server 110 connects to. In this example, a physical Ethernet cable connects 120 from an Ethernet port of NIC 114 to one of the Ethernet ports of Switch A 122. Connection 120 has gone through the DHCP protocol process, which is not pictured in FIG. 1. During that first DHCP process, an IP address was requested from DHCP Server A 124, which communicated with Switch A 122. DHCP Server A 124 sent a reply back to the server 110 through Switch A 122, containing a specific IP address. The IP address was then bound to the server for a given lease period specified by DHCP Server A's 124 administration policy.

The X designated over the connection 120 indicates that the Ethernet cable was removed from Switch A 122. At the moment when the Ethernet cable was removed from Switch A 122, NIC 114's link state changed from "up", indicating a connection, to "down", indicating no connection with Switch A 122. With no connection and an NIC link state of "down", DHCP Client 140 released the first IP address obtained from DHCP Server A 124. Thus, there is no IP address bound to the server 110 at this point.

The Ethernet cable was then moved to Switch B 132, resulting in a new connection 130 between NIC 114 and Switch B 132. At this point, the NIC 114 link state changes from "down" to "up", indicating that a new connection has been established for NIC 114. DHCP Client 140 receives a signal that the NIC 114 link state has changed to "up", and sends a DHCP Request 142 to DHCP Server B 134, which is connected to Switch B 132. DHCP Server B 134 then sends a DHCP Reply 144 back to DHCP Client 140, containing a new, second IP address. DHCP Client 140 then binds the IP address to Server 110, establishing communication between Server 110 and the new network domain.

Figure 2:
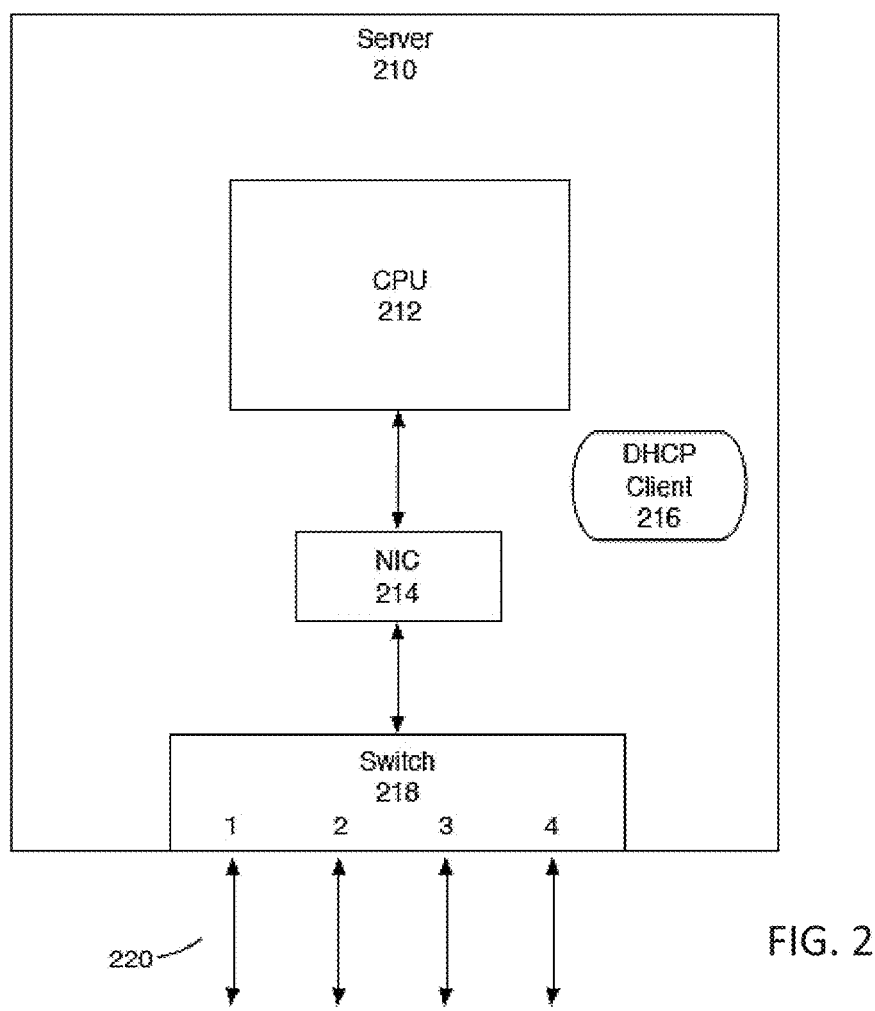
FIG. 2 illustrates an example server configuration with embedded switch.

FIG. 2 illustrates an embodiment of a server configuration with an embedded switch, e.g., wherein a switch is integrated into the motherboard of a server, presenting the aforementioned problems for detecting NIC link state changes. Server 210 is a server device containing a central processing unit (CPU) 212, a network interface card (NIC) 214, a DHCP client 216, and a switch 218. CPU 212 provides instructions to, and communicates with, NIC 214 to provide connection, addressing, and packet data transfer between Server 210 and the network (not pictured). In turn, NIC 214 communicates with switch 218 by identifying active ports, and sending and receiving data. In this embodiment, rather than a user plugging a cable into or out of NIC 214, NIC 214 has a built-in connection to switch 218. Switch 218, on the other hand, may have one or more user-accessible cables connected to its Ethernet ports.

Switch 218 contains one or more ports by which the server may make connections with network domains. In some embodiments, the ports may be virtual ports rather than physical ports. In additional embodiments, switch 218 may be embedded into the NIC 214. In the illustrated embodiment, four ports are depicted, though a switch 218 may contain any number of physical and/or virtual ports. Each port is capable of communication with a network domain, designated by the connections 220. In some embodiments, connections 220 may constitute communication with a DHCP server, such as DHCP Server A 124 or DHCP Server B 134 of FIG. 1. Switch 218 contains a link state for each of the ports, which pertains to the active or inactive link establishment with NIC 214. For example, port 1 of switch 218 can have an active connection with a DHCP Server, and an IP address 192.168.1.100 can be bound to the server. Alternatively, port 1 has no active connection with a network. Switch 218 is able to detect a link state change when a connection is active or inactive, but NIC 214 is communicatively coupled to switch 218 and also to CPU 212. The link state of port 1 of switch 218 registers as "up" with respect to NIC 214. NIC 214 also has a link state, which pertains to whether there is an active connection with switch 218. Since both switch 218 and NIC 214 are integrated into server 210, in most scenarios NIC 214 will have an active link state of "up", due to the constant active connection between NIC 214 and Switch 218. Thus, because CPU 212 and NIC 214 are in communication, rather than CPU 212 and Switch 218, CPU 212 does not detect a link state change when an external cable is plugged or unplugged from Switch 218.

In this embodiment, CPU 212 will inform DHCP client 216 when the NIC link state changes, and instruct DHCP client 216 to make a DHCP request when needed. However, a cable plugged into a port (e.g., Ethernet) of switch 218 or unplugged from switch 218 will not result in CPU 212 informing the DHCP client 216 of any change, as the CPU is not capable of detecting whether the switch 218 has a cable plugged into a port or not. CPU 212 interacts with the NIC 214, not Switch 218, and is capable of detecting only when NIC 214 link state changes. Thus, FIG. 2 illustrates the issue of link state not being properly detected by server 210, leading to a new IP address not being properly obtained. Such an issue leads to connection failure.

Figure 3:
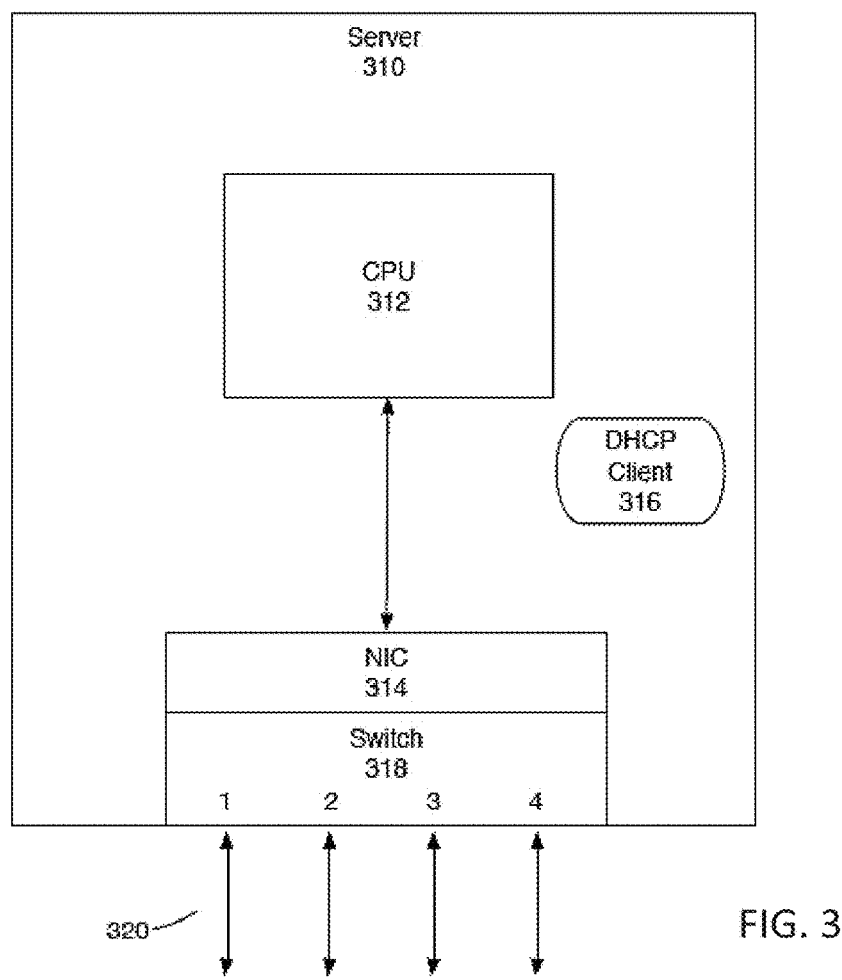
FIG. 3 illustrates an example server configuration with embedded switch and network interface card coupled to the switch.

FIG. 3 illustrates an example server configuration with embedded switch and network interface card coupled to the switch. In FIG. 3, the server configuration of FIG. 2 is slightly modified. As in FIG. 2, a server 310 contains CPU 312, NIC 314, switch 318, and DHCP client 316. This configuration differs from the embodiment in FIG. 2 in that NIC 314 is integrated with switch 318. This is an example where both NIC 314 and switch 318 are included within a South Bridge chip (not pictured) on server 310's motherboard. In such a chipset, the South Bridge chip handles all I/O connections, while the North Bridge chip (not pictured) includes the CPU and other core logic aspects of server 310.

The configuration of FIG. 3 suffers from the same link state detection problems as the configuration of FIG. 2. When an Ethernet cable is removed from server 310, server 310 cannot detect the link state change. As in FIG. 2, switch 318 is capable of detecting a link state change, but NIC 314 resides on top of switch 318. NIC 314 and switch 318 are thus always in good connection, and the link state between NIC 314 and switch 318 is always "up". Thus, CPU 312 does not detect a link change when a cable is removed from one of the ports 320 of switch 318, and cannot instruct DHCP client 316 to obtain a new IP address when needed.

Figure 4:
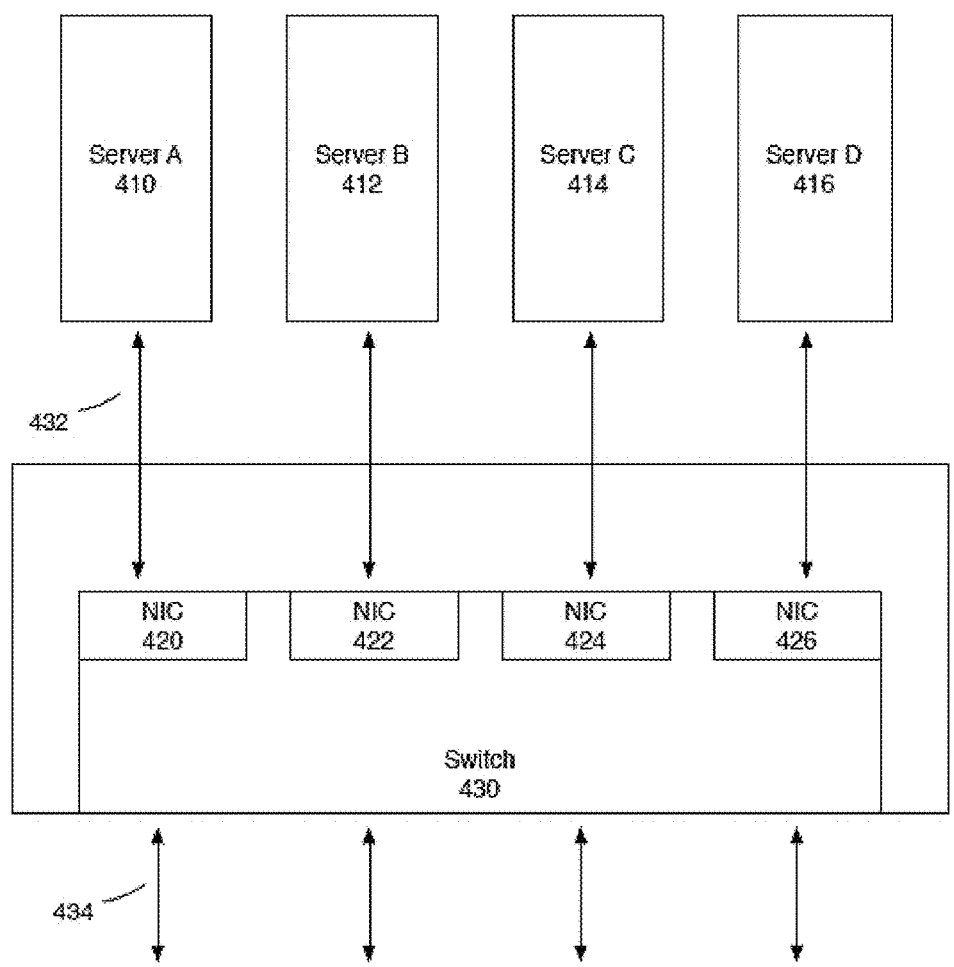
FIG. 4 illustrates an example server configuration in which network interface cards are integrated into a switch which connects with servers through a serial expansion bus.

FIG. 4 illustrates an example server configuration in which several network interface cards are integrated into a switch, which connects with servers through a serial expansion bus. A multitude of server nodes connect to a switch 430, which contains a multitude of NICs. In this embodiment, Server A 410, Server B 412, Server C 414, and Server D 416 connect to, respectively, NIC 420, NIC 422, NIC 424, and NIC 426. In the example of FIG. 4, the connections 432 are through serial expansion bus. In some embodiments, the connections 432 are implemented through a high-speed serial computer expansion bus standard, such as PCI Express. In some embodiments, server nodes 410-416 connect to switch 430 with a copper implementation. In other embodiments, the implementation is a hybrid copper-fiber implementation. Switch 430 integrates the multitude of NICs 420-426 and offers multiple ports 434 for connection to a network.

In FIG. 4, in contrast to FIG. 2 and FIG. 3, the NICs 420-426 are external to the servers 410-416. The NICs are thus not embedded in the server node. This results in an issue where the servers 410-416 are incapable of detecting the link state changes of NICs 420-426 and the switch 430. Therefore, servers 410-416 cannot obtain new IP addresses when a link state change occurs.

Figure 5:
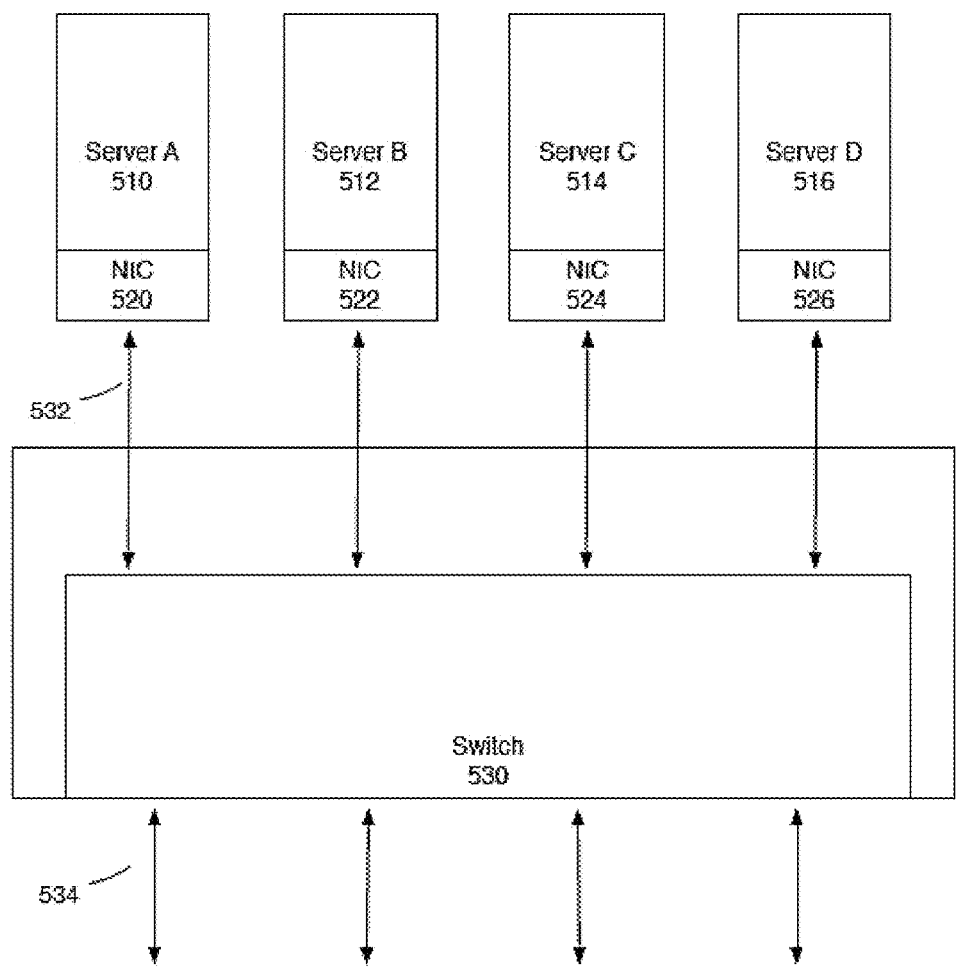
FIG. 5 illustrates an example server configuration in which network interface cards connect to a switch.

FIG. 5 is an example server design with a link state detection issue. FIG. 5 illustrates an example server configuration in which network interface cards connect to a switch through backplane KR, backplane KX, or other such Ethernet interface. The backplane KR and backplane KX interfaces are uses copper signal paths that establishes high signal fidelity and integrity between NICs 520-526 and switch 530. In this illustration, a multitude of server nodes connect to a switch 530. The servers 510, 512, 514, and 516 each contain an embedded network interface card, represented by NICs 520, 522, 524, and 526. Switch 530 is an external switch with multiple ports 534 for communication. In some embodiments, switch 530 is a generic, traditional Ethernet switch with multiple ports. NICs 520-526 each connect 532 to switch 530 by backplane KR, backplane KX, or other such Ethernet interface.

While switch 530 is external to the server nodes, as in FIG. 1, unlike FIG. 1 there is no Ethernet cable which is physically connected between the network interface card and the switch. Instead, high fidelity copper backplane connections are always present between the servers and switch, resulting in constant communication between NICs 520-526 and switch 530. Thus, the same issue results in failure of servers 510-516 to detect link state changes and request new IP addresses when needed.

An example embodiment addressing the difficulties as presented in FIGS. 2-5 is for the server CPU or OS to periodically check the switch link status by polling the switch API or register. When a switch is embedded in a server, the CPU of the server can be configured to "poll", or continuously check, the switch's API or register to determine a link state. This is a software approach that can be implemented without any hardware or firmware changes to the server configuration. Once a link state change of the switch is determined by polling, the server can instruct the DHCP client to act accordingly by sending a DHCP reply to obtain a new IP address.

In an embodiment, this example approach relies on the switch being embedded within or internal to the server. Thus, the configurations of FIG. 2 and FIG. 3 will have their link state detection issue addressed by this approach, but the configurations of FIG. 4 and FIG. 5 will not. This is because the configurations of FIG. 4 and FIG. 5 both have switches which are external to the server. Additionally, this example approach is not software-transparent, meaning that software must be modified or additional software implementation is needed within the server. While traditionally the server detects the NIC link state, additional software is needed to detect the switch link state. Thus, the operating system of the server will need additional detection implementation.

Figure 6:
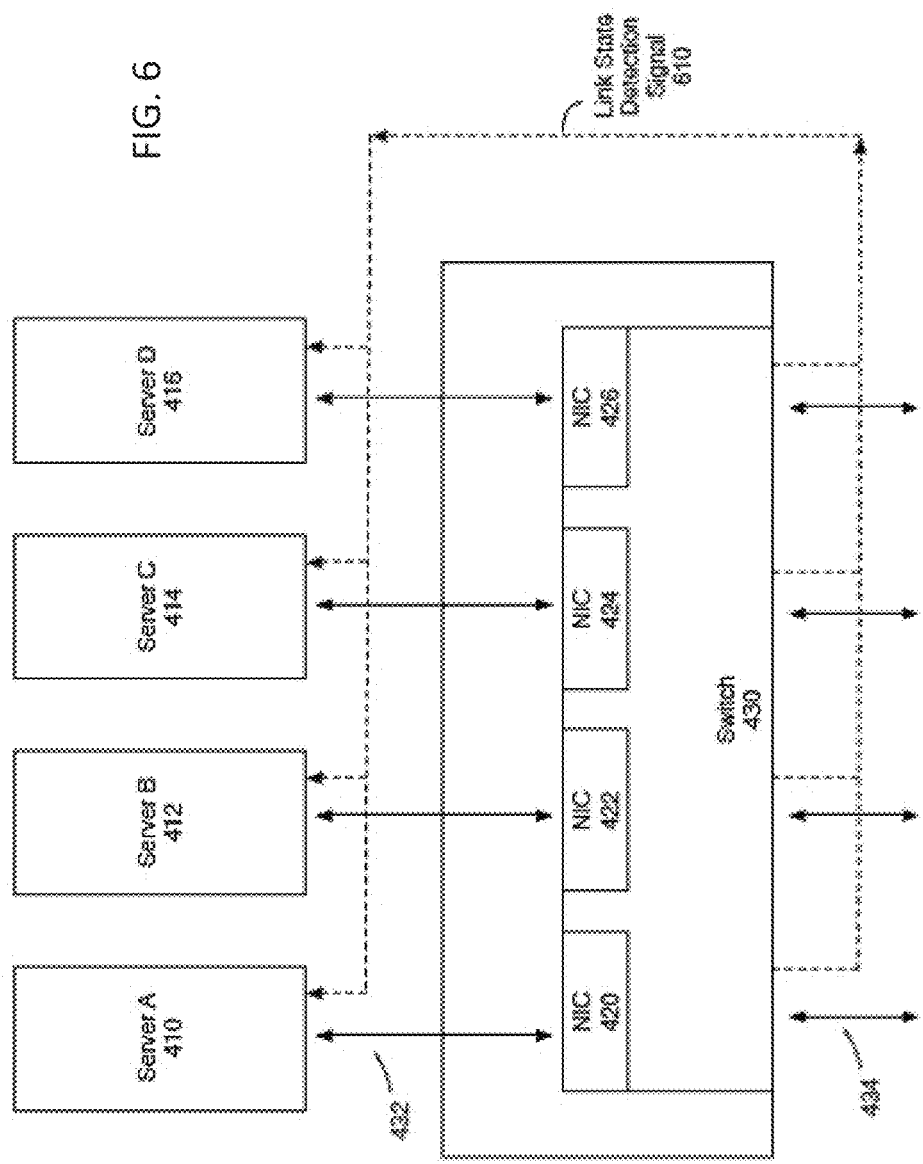
FIG. 6 illustrates an example server configuration in which a link state detection signal is implemented.

FIG. 6 illustrates an example server configuration in which a link state detection signal is implemented. The server configuration of FIG. 6 is identical to the configuration of FIG. 4, in which a multitude of NICs 420-426 are embedded in a switch 430, with servers 410-416 connected to the external switch 430. In the embodiment illustrated by FIG. 6, however, a hardware link state detection signal 610 is added. Switch 430 contains a light-emitting diode (LED) for each port, signaling a link state for that port. When the link is up, the LED is on. When the link is down, the LED is off. Link state detection signal 610 connects to the link state LED of each port, and is detects the signal used to trigger the LED light. When the LED is on, the electricity of the signal is detected by link state detection signal 610. This link state information is then transmitted to the respective server 410-416, indicating the link state of the switch to the server. Thus, link state can be detected or notified by this implementation of a hardware link state detection signal 610.

In another embodiment of the present technology, a "Link State Policy Table" is added to the switch. In some embodiments, this Link State Policy Table may be added by a firmware update to the server. In other embodiments, it may be added by a hardware implementation, wherein the table is embedded within the switch's chipset.

In an embodiment, the Link State Policy Table contains a register which can configure the table. This register may contain one or more settings for the Link State Policy Table which allow the NIC link state to be changed upon the switch detecting a link state change. Using the Link State Policy Table, the NIC link state may be changed to reflect a change in the switch link state, and the CPU of the server can then instruct the DHCP client to request a new IP address. This solves the link state detection and notification issues with FIGS. 2-5. Examples embodiments of this technique will be explored in further detail in relation to FIG. 7 and FIG. 8.

Figure 7:
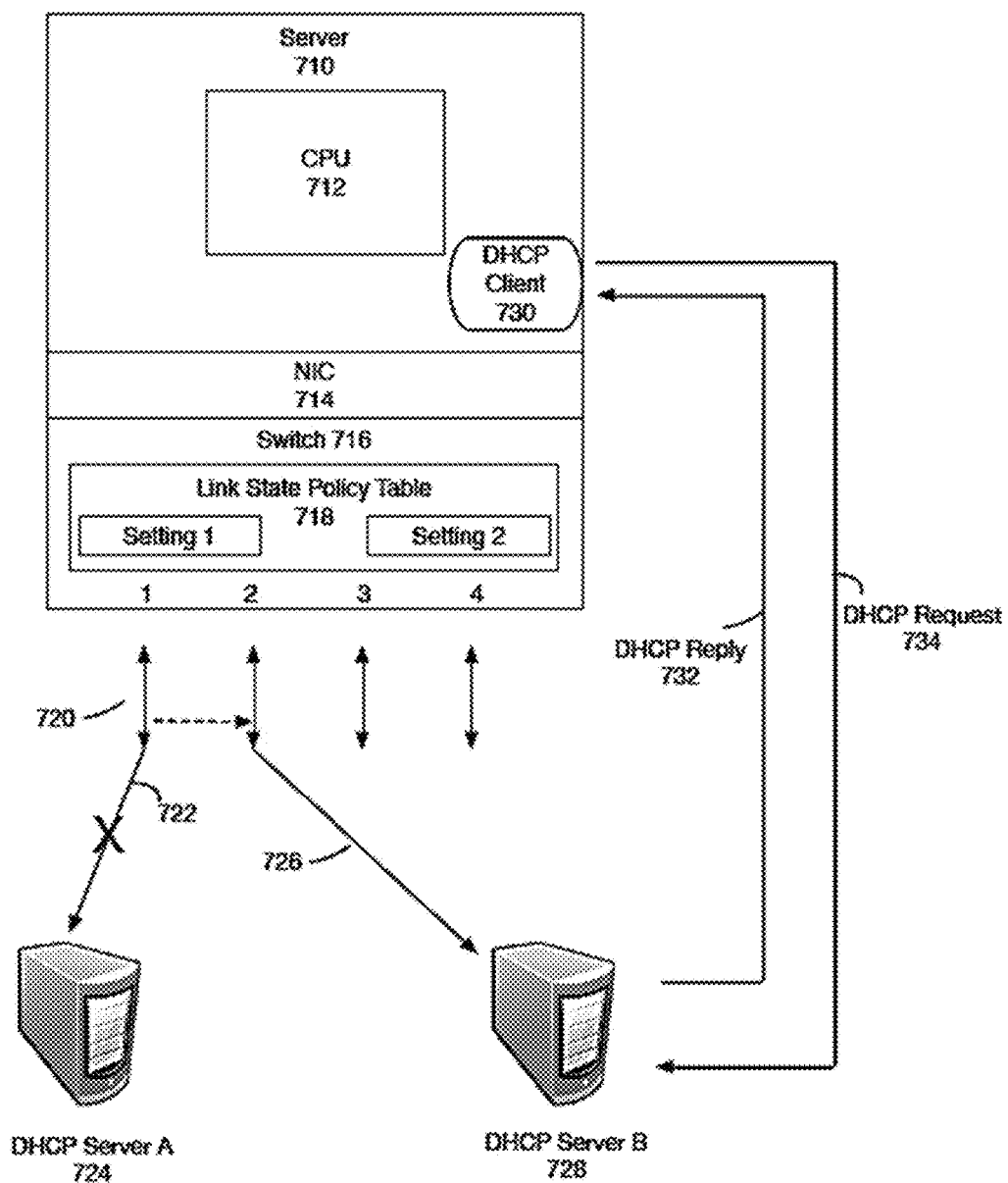
FIG. 7 illustrates an example server configuration in which a link state policy table is implemented.

FIG. 7 illustrates an example server configuration in which a link state policy table is implemented. The server configuration of FIG. 7 is similar in many respects to the server configuration illustrated in FIG. 3, in that a South Bridge chip design integrates both an Ethernet switch and a NIC together within the server. Server 710 is a networked server with CPU 712. In some embodiments, CPU 712 is incorporated into a North Bridge chip design. CPU 712 is configured to connect to and communicate with NIC 714. In some embodiments, CPU 712 is also configured to send instructions to a DHCP client 730, which is capable of sending DHCP requests, receiving DHCP replies, and otherwise negotiating elements of the DHCP protocol process.

In some embodiments, server 710 may contain a baseboard management controller (BMC) (not pictured). A BMC is an independent and embedded microcontroller that in some embodiments is responsible for the management and monitoring of the main CPU, firmware and operating system of server 710. According to some embodiments, the BMC can monitor the server's hardware components by receiving data from sensors installed in the chassis, e.g., fan speeds, CPU temperature, power consumption level, etc. In some embodiments, the BMC sends instructions to the DHCP client 730 which have been generated in response to messages from CPU 712. In some embodiments, the BMC is capable of executing instructions which result in link state changes or other changes within server 710.

In an embodiment, NIC 714 is integrated into a South Bridge chip design, along with switch 716. NIC 714 is a network interface card that communicates with the CPU, and also sends and receives data from switch 716. Switch 716 is a network switch adapted to connect to network domains. Switch 716 receives data from and sends data to DHCP Server A 724. Switch 716 contains a multitude of ports, illustrated here by ports 1, 2, 3, and 4. In some embodiments, the ports are physical Ethernet ports. In other embodiments, the ports are virtual ports. Each port is configured to facilitate network connections 720. In some embodiments, the connection occurs due to an Ethernet cable being plugged into a specific port. For embodiments with virtual ports, an Ethernet cable can be simply plugged into a general port, and port switching can happen in a virtual switching environment.

Switch 716 contains a Link State Policy Table 718. In some embodiments, Link State Policy Table 718 can be implemented within switch 716's firmware. For example, Link State Policy Table 718 can exist as one or more software commands within switch 716's firmware. In other embodiments, the Link State Policy Table 718 can be implemented within the switch hardware, such as being integrated as a hardware register into the South Bridge chip of the server 710 motherboard. The Link State Policy Table serves as a way to change the NIC link state in order to reflect various link state changes within the switch. In this way, it bridges the link states of NIC 714 and switch 716, allowing CPU 712 of the server to be properly notified of switch link state changes. Thus, CPU 712 can then instruct DHCP client 730 to perform DHCP processes, such as sending a DHCP request, when various link state changes occur.

In an embodiment, Link State Policy Table 718 contains Setting 1 and Setting 2. In some embodiments, these settings can be implemented within a register which configures the table according to Setting 1 and Setting 2. In other embodiments, the settings can be implemented with commands and variables within switch 716's firmware. In some embodiments, only one setting may be configured for Link State Policy Table 718. In other embodiments, several settings can be implemented. In the exemplary embodiment as well as some alternative embodiments, these settings may be user-defined policies which are fully configurable by a user.

In an embodiment, Link State Policy Table 718 is a software-transparent and OS-transparent solution, meaning that the operating system of Server 710 and CPU 712 do not require any additional software for Link State Policy Table 718 to function as intended. While the switch firmware or hardware may be updated for Link State Policy Table 718 to be implemented, the OS of Server 710 requires no additional implementation.

In the example of FIG. 7, both Setting 1 and Setting 2 of the Link State Policy Table 718 have defined settings. Setting 1 is defined as: "NIC state=Link 1 State." Setting 2 is defined as: "NIC state toggled if any link state changed." While Setting 1 and Setting 2 may be defined to be any such statement regarding link states, these exemplary defined settings serve to illustrate how NIC link state can be changed to serve different purposes. In the exemplary embodiment, either Setting 1 is engaged or Setting 2 is engaged, but not both at once. In some embodiments, multiple settings can be simultaneously engaged, barring a conflict between them.

With respect to Setting 1, "NIC state=Link 1 State", the intent is to notify CPU 712 whenever the link state of (for example) the first port of switch 716 changes. This is done in situations where only the first port of switch 716 is going to uplink, and no other ports will. When switch 716 detects a link state change in the first port, i.e., registering the link state as "down", this indicates that the first port is inactive, and possibly that the Ethernet cable has moved to another switch. Switch 716 consults Link State Policy Table 718, which has Setting 1 engaged. Setting 1 instructs switch 716 to change the NIC 714 link state to be equivalent to the link state of the first port of switch 716. At this point, since the link state of the first port is "down", the NIC 714 link state is also changed to "down." CPU 712 is automatically notified of NIC 714 link state changing to down, since the OS is automatically configured to detect and respond to the NIC link state. CPU 712 can then instruct DHCP client 730 to release the currently-leased IP address from server 710.

In the event the link state of the first port changes back to "up", switch 716 detects this link state change, consults Link State Policy Table 718 with Setting 1, and changes the NIC link state from "down" to "up." CPU 712 is automatically notified of this change, and can instruct DHCP Client 730 to send a DHCP request 734 to a new DHCP Server B 728.

With respect to Setting 2, "NIC state toggled if any link state changed", the intent is to reflect a situation where multiple ports of switch 716 may potentially uplink with a network, or where an Ethernet cable may be moved from one port to another port. In this situation, when any link state of switch 716 is changed, the intent is to notify CPU 712 to respond accordingly. For example, the first port of switch 716 may be active, with the NIC link state registering as "up". An Ethernet cable 720 may be plugged into the first port, establishing connection 722 with DHCP Server A 724. If the cable 720 is removed from the first port of switch 716, then connection 722 is removed, the first port is no longer active, and the first port's link state changes to "down." Switch 716 detects this, and consults Link State Policy Table 718, which is set to Setting 2. Following Setting 2, the NIC link state is toggled to "down" to reflect the first port's link state change. CPU 712 is notified of this, and instructs DHCP client 730 to release the old IP address that was associated with DHCP Server A 724.

Subsequently, Ethernet cable 720 may be plugged into the second port of switch 716, establishing connection 726, and causing the link state of the second port to register as "up." Switch 716 detects this link state change, and consults the Link State Policy Table. Following Setting 2 again, the NIC link state is changed to "up" to reflect any link state changing, in this case the second port's link state changing. CPU 712 is notified of this, and instructs DHCP client 730 to send a DHCP request 734 to the new DHCP Server B 728. DHCP Server B 728 responds by sending a DHCP Reply 732 to DHCP client 730 containing a new IP address. DHCP client 730 then binds the new IP address to server 710, thus allowing the connection to proceed. In this way, link state is properly detected, the OS is notified, and the DHCP protocol process can result in a new IP address being obtained, leading to a connection with a new IP domain. Thus, the link state problems illustrated in FIGS. 2-5 can be avoided with the implementation of the Link State Policy Table 718 of FIG. 7.

Figure 8:
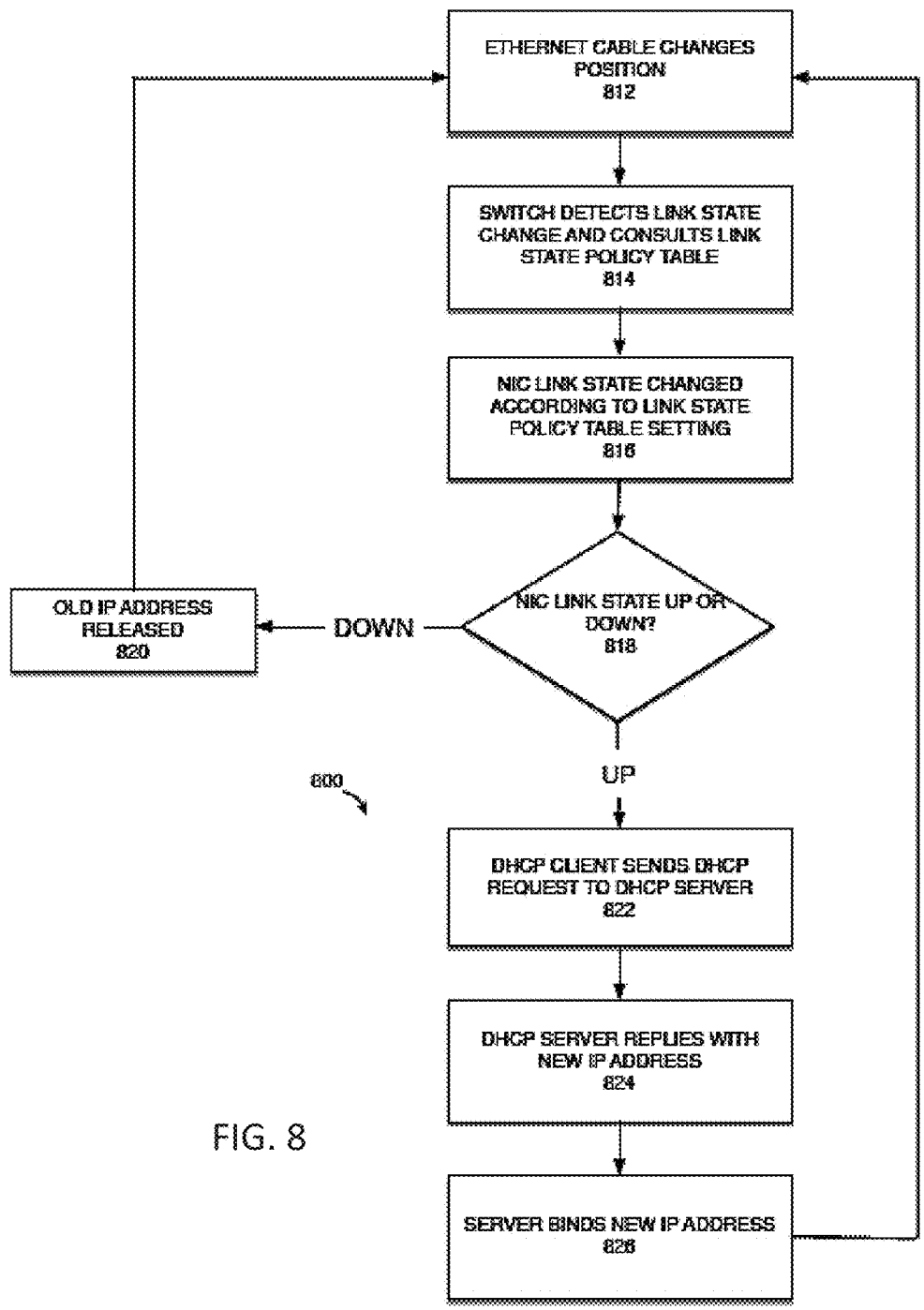
FIG. 8 is a flow diagram illustrating an example method embodiment of the link state detection and DHCP process utilizing a link state policy table.

FIG. 8 is a flowchart illustrating an exemplary method embodiment of the link state detection and DHCP process utilizing a link state policy table when a Link State Policy Table is implemented in a switch, such as in the server configuration of FIG. 7.

At step 812, an Ethernet cable changes position within the switch. In some embodiments this can mean that the Ethernet cable is plugged into a first port of the switch, that the Ethernet cable is unplugged from the first port of the switch, that the Ethernet cable is plugged into the second port of the switch, and so on. As soon as the Ethernet cable changes position, this is reflected within the link state of the respective port within the switch. For example, if the Ethernet cable is unplugged from the first port, then the first port's link state changes to "down" automatically.

At step 814, the switch is configured to detect the link state change which occurred in step 812. If the first port's link state changed to "down", for example, then the switch detects this change. It then proceeds to consult the Link State Policy Table for instructions regarding the link state change.

At step 816, the NIC's link state is changed according to the Link State Policy Table's defined setting or settings. In some embodiments, this setting may be user-defined and fully configurable. In other embodiments, the setting is pre-defined and/or non-configurable by the user. In a first example setting, the Link State Policy Table is configured to change the NIC link state to mirror the first port's link state. In a second example setting, the Link State Policy Table is configured to change the NIC link state whenever there's any change in the link states of any port within the switch. If the first port's link state changes to "down", for example, then the NIC link state is toggled. In a third example setting, the Link Sate Policy Table is configured to change the NIC link state from a high state to a down state for a down period (t1) then back to the high state, in response to the first port's link state changing from a down state to an up state.

At step 818, the NIC link state may register as either "up" or "down" based on the NIC link state change which occurred at step 816. The CPU of the server is automatically notified whenever the NIC link state changes. Different actions may occur depending on the CPU being notified of the NIC link state change.

At step 820, the NIC link state registers as "down" as a result of the NIC link state change which occurred in step 816. This is a signal that the connection has changed as a result of a policy setting in the Link State Policy Table. In the example of Setting 2, it signals that one of the link states has changed to inactive. The CPU is notified of this NIC link state, and responds by instructing the DHCP client to release the old IP address, as the former connection is no longer established with the network. With the IP address being released, the method returns to the beginning at step 810, to await a link state change.

Alternatively, at step 822, the NIC link state registers as "up" as a result of the NIC link state change which occurred in step 816. This is a signal that the connection has changed as a result of a policy setting in the Link State Policy Table. In the example of Setting 2, it signals that one of the link states of the port has changed to active. The CPU is notified of this NIC link state, and responds by instructing the DHCP client to send a DHCP request to the new DHCP server. This is to obtain a new IP address from the new DHCP server. A new IP address is required to establish communication and transfer data to and from the new network domain.

Continuing at step 824, the new DHCP server sends a DHCP reply with a new IP address to the DHCP client of the server. At step 826, the server binds this new IP address, establishing the IP address as the connecting address with which communication with the new network may proceed. Thus, throughout the method 800, we see a flowchart of steps in which a link state change is detected, the OS is notified, and the DHCP client can follow DHCP protocol properly with respect to that link state change.

FIG. 9 is a block diagram of an example System Architecture 900 implementing the features and processes of FIGS. 1-8. The architecture 900 can be implemented on any electronic device that runs software applications derived from compiled instructions, including without limitation personal computers, servers, smart phones, media players, electronic tablets, game consoles, email devices, etc. In some implementations, the architecture 900 can include one or more processors 902, one or more input devices 904, one or more display devices 906, one or more network interfaces 908 and one or more computer-readable mediums 910. Each of these components can be coupled by bus 912.

Display device 906 can be any known display technology, including but not limited to display devices using Liquid Crystal Display (LCD) or Light Emitting Diode (LED) technology. Processor(s) 902 can use any known processor technology, including but are not limited to graphics processors and multi-core processors. Input device 904 can be any known input device technology, including but not limited to a keyboard (including a virtual keyboard), mouse, track ball, and touch-sensitive pad or display. Bus 912 can be any known internal or external bus technology, including but not limited to ISA, EISA, PCI, PCI Express, NuBus, USB, Serial ATA or FireWire.

Computer-readable medium 910 can be any medium that participates in providing instructions to processor(s) 902 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 910 can include various instructions 914 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 can establish and maintain network connections (e.g., software for implementing communication protocols, such as TCP/IP, HTTP, Ethernet, etc.).

A graphics processing system 918 can include instructions that provide graphics and image processing capabilities. For example, the graphics processing system 918 can implement the processes described with reference to FIGS. 1-5. Application(s) 920 can be an application that uses or implements the processes described in reference to FIGS. 1-5. For example, applications 920 can generate the console messages (e.g., serial output) that is redirected by the service controller using HTTP. The processes can also be implemented in operating system 914.

Service controller 922 can be a controller that operates independently of processor(s) 902 and/or operating system 914. In some implementations, system controller 922 can be powered and operational before processor(s) 902 are powered on and operating system 914 is loaded into processor(s) 902. For example, system controller 922 can provide for pre-OS management of the computing device through a dedicated network interface or other input device. For example, system controller 922 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 922 can be implement the processes described with reference to FIGS. 1-5 above. For example, service controller 922 can be configured with a web server for redirecting the serial output over a network using HTTP.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:
1. A method, comprising:
detecting a change in a first link state for one or more ports of a network switch communicatively coupled to a server;
determining that a link state policy table is engaged with a second policy setting, wherein the link state policy table is capable of engaging with either the second policy setting or a first policy setting, but not simultaneously engaging with both the first policy setting and the second policy setting, wherein two or more ports of the network switch are uplink ports when the link state policy table is engaged with the second policy setting, wherein only one port of the network switch is an uplink port when the link state policy is engaged with the first policy setting;
detecting a change in a second link state for a network interface card (NIC), wherein the change in the second link state for the NIC corresponds to the change in the first link state for the one or more ports of the network switch, wherein each of the first link state and the second link state comprises either an up state or a down state, and wherein the server includes a Dynamic Host Configuration Protocol (DHCP) client, the DHCP client capable of sending out a DHCP request for a new IP address in response to detecting the second link state changing from the down state to the up state, and releasing an IP address that was previously bound to the server in response to detecting the second link state changing from the up state to the down state;
changing the second link state for the NIC according to the link state policy table; the link state policy table configured to change the second link state for the NIC according to the second policy setting;
obtaining a first address for a first network based on the change in the second link state for the NIC; and
associating the first address with the server.

2. The method of claim 1, wherein the server is informed of the change in the first link state through a hardware-implemented link state detection signal.

3. The method of claim 2, wherein detecting the change in the first link state comprises:
detecting power being transmitted to a light-emitting diode (LED) of the network switch; and
determining, based on the detection, that the first link state of the one or more ports of the network switch is up.

4. The method of claim 1, wherein detecting the change in the first link state for one or more ports of a network switch comprises:
sending a request for a port link state to the network switch at a periodic interval.

5. The method of claim 1, further comprising:
accessing the link state policy table for the network switch, wherein the link state policy table is operable to change the second link state for the NIC.

6. The method of claim 5, wherein accessing the link state policy table for the network switch comprises:
determining a third link state for a first port of the network switch; and
changing the second link state for the NIC to correspond to the third link state for the first port of the network switch.

7. The method of claim 5, wherein accessing the link state policy table for the network switch comprises:
determining a change in a third link state for any of the one or more ports of the network switch; and
changing the second link state for the NIC.

8. The method of claim 5, wherein accessing the link state policy table for the network switch comprises:
determining a down to up change in a third link state for a first port of the network switch; and
changing the second link state for the NIC from a high state to a down state for a down period of time then back to the high state.

9. The method of claim 5, wherein the link state policy table comprises one or more registers, and wherein each of the one or more registers contains a link state notification setting.

10. The method of claim 1, wherein obtaining the first address for the first network comprises:
sending a DHCP request to a DHCP server, and
receiving a DHCP reply containing the first address from the DHCP server.

11. The method of claim 1, wherein the network switch is embedded in the NIC.

12. A system, comprising:
a network switch comprising one or more ports, each of the one or more ports having a first link state, the link state corresponding to whether an associated port is up, the network switch communicatively coupled to a server;
a network interface card (NIC) communicatively coupled to the network switch, wherein the NIC has a second link state corresponding to whether the NIC is up, wherein the network switch has a link state policy table, the link state policy table operable to change the second link state for the NIC, wherein each of the first link state and the second link state comprises either an up state or a down state, and wherein the server includes a Dynamic Host Configuration Protocol (DHCP) client, the DHCP client capable of sending out a DHCP request for a new IP address in response to detecting the second link state changing from the down state to the up state, and releasing an IP address that was previously bound to the server in response to detecting the second link state changing from the up state to the down state;
a processor; and
a computer-readable medium storing instructions that, when executed by the processor, cause the system to:
determine that a link state policy table is engaged with a second policy setting, wherein the link state policy table is capable of engaging with either the second policy setting or a first policy setting, but not simultaneously engaging with both the first policy setting and the second policy setting, wherein two or more ports of the network switch are uplink ports when the link state policy table is engaged with the second policy setting, wherein only one port of the network switch is an uplink port when the link state policy is engaged with the first policy setting;
detect the second link state for the NIC,
determine that the second link state for the NIC is up;
obtain a first address for a first network; and
associate the first address with the server.

13. The system of claim 12, wherein the link state policy table comprises one or more registers, and wherein each of the one or more registers is for a link state policy setting.

14. The system of claim 12, wherein the link state policy table is operable to change the second link state for the NIC corresponding to a third-link state for a first port of the network switch.

15. The method of claim 2, wherein detecting the link state detection signal comprises: detecting an interrupt signal for a central processing unit (CPU) of the server.

16. The system of claim 12, wherein the computer-readable medium storing instructions that, when executed by the processor, further cause the system to:
accessing the link state policy table for the network switch, wherein the link state policy table is operable to change the second link state for the NIC.

17. The system of claim 16, wherein accessing the link state policy table for the network switch comprises:
determining a third link state for a first port of the network switch; and
changing the second link state for the NIC to correspond to the third link state for the first port of the network switch.

18. The system of claim 16, wherein accessing the link state policy table for the network switch comprises:
determining a change in a third link state for any of the one or more ports of the network switch; and
changing the second link state for the NIC.

19. The system of claim 16, wherein accessing the link state policy table for the network switch comprises:
determining a down to up change in a third link state for a first port of the network switch; and
changing the second link state for the NIC from a high state to a down state for a down period of time then back to the high state.

20. A non-transitory computer-readable storage medium including instructions that, when executed by at least one processor of a system, cause the system to perform operations comprising:
detecting a change in a first link state for one or more ports of a network switch communicatively coupled to a server;

determining that a link state policy table is engaged with a second policy setting, wherein the link state policy table is capable of engaging with either the second policy setting or a first policy setting, but not simultaneously engaging with both the first policy setting and the second policy setting, wherein two or more ports of the network switch are uplink ports when the link state policy table is engaged with the second policy setting, wherein only one port of the network switch is an uplink port when the link state policy is engaged with the first policy setting;

detecting a change in a second link state for a network interface card (NIC), wherein the change in the second link state for the NIC corresponds to the change in the first link state for the one or more ports of the network switch, wherein each of the first link state and the second link state comprises either an up state or a down state, and wherein the server includes a Dynamic Host Configuration Protocol (DHCP) client, the DHCP client capable of sending out a DHCP request for a new IP address in response to detecting the second link state changing from the down state to the up state, and releasing an IP address that was previously bound to the server in response to detecting the second link state changing from the up state to the down state;

changing the second link state for the NIC according to the link state policy table; the link state policy table configured to change the second link state for the NIC according to the second policy setting;

obtaining a first address for a first network based on the change in the second link state for the NIC; and associating the first address with the server.

* * * * *